US010887018B2

(12) United States Patent
Gronvall

(10) Patent No.: US 10,887,018 B2
(45) Date of Patent: Jan. 5, 2021

(54) FIBER OPTIC NETWORK ARCHITECTURE WITH PARALLEL INDEXED AND NON-INDEXED FIBER PATHS

(71) Applicant: COMMSCOPE TECHNOLOGIES LLC, Hickory, NC (US)

(72) Inventor: Erik J. Gronvall, Bloomington, MN (US)

(73) Assignee: CommScpe Technologies LLC, Hickory, NC (US)

( * ) Notice: Subject to any disclaimer, the term of this patent is extended or adjusted under 35 U.S.C. 154(b) by 0 days.

(21) Appl. No.: 16/347,043

(22) PCT Filed: Nov. 1, 2017

(86) PCT No.: PCT/US2017/059528

§ 371 (c)(1),
(2) Date: May 2, 2019

(87) PCT Pub. No.: WO2018/085397

PCT Pub. Date: May 11, 2018

(65) Prior Publication Data

US 2019/0260475 A1 Aug. 22, 2019

Related U.S. Application Data

(60) Provisional application No. 62/416,691, filed on Nov. 2, 2016.

(51) Int. Cl.

| | |
|---|---|
| ***H04B 10/27*** | (2013.01) |
| ***G02B 6/44*** | (2006.01) |

(Continued)

(52) U.S. Cl.

CPC .......... *H04B 10/27* (2013.01); *G02B 6/4472* (2013.01); *H04Q 11/0062* (2013.01); *H04Q 11/06* (2013.01); *G02B 6/3885* (2013.01); *G02B 6/4471* (2013.01); *H04B 10/25* (2013.01); *H04Q 11/00* (2013.01)

(58) Field of Classification Search

None

See application file for complete search history.

(56) References Cited

U.S. PATENT DOCUMENTS 7,744,288 B2 6/2010 Lu et al.
9,207,421 B2 12/2015 Conner (Continued)

FOREIGN PATENT DOCUMENTS

EP 1 981 185 A1 10/2008
JP H10-32545 A 2/1998

(Continued)

OTHER PUBLICATIONS

International Search Report and Written Opinion of the International Searching Authority for International Patent Application No. PCT/US2017/059528 dated Feb. 21, 2018, 14 pages.

*Primary Examiner* — Jerry Rahll

(74) *Attorney, Agent, or Firm* — Merchant & Gould P.C.

(57) ABSTRACT

The present disclosure relates to a fiber optic network including a plurality of fiber distribution components daisy chained together to form a chain of fiber distribution components, the chain of fiber distribution components having a first set of optical fiber paths that are indexed along a length of the chain and a second set of optical fiber paths that are not indexed along a length of the chain.

21 Claims, 15 Drawing Sheets

(51) Int. Cl.

| | |
|---|---|
| ***H04Q 11/00*** | (2006.01) |
| ***H04Q 11/06*** | (2006.01) |
| *H04B 10/25* | (2013.01) |
| *G02B 6/38* | (2006.01) |

(56) References Cited

U.S. PATENT DOCUMENTS

| | | | |
|---|---|---|---|
| 9,348,096 | B2 | 5/2016 | Kmit et al. |
| 9,557,498 | B2 | 1/2017 | Loeffelholz |
| 10,151,897 | B2 | 12/2018 | Gronvall et al. |
| 2010/0092129 | A1 | 4/2010 | Conner |
| 2013/0034336 | A1 | 2/2013 | Cassell et al. |
| 2014/0161402 | A1 | 6/2014 | Cunningham |
| 2014/0294390 | A1 | 10/2014 | Badinelli |
| 2015/0378112 | A1 | 12/2015 | Marcouiller et al. |

FOREIGN PATENT DOCUMENTS

| | | | |
|---|---|---|---|
| WO | 2013/149150 | A1 | 10/2013 |
| WO | 2014/190281 | A1 | 11/2014 |
| WO | 2015/200826 | A1 | 12/2015 |
| WO | 2016/043922 | A1 | 3/2016 |
| WO | 2016/057411 | A1 | 4/2016 |
| WO | 2016/137934 | A1 | 9/2016 |
| WO | 2017/132388 | A1 | 8/2017 |

Splitter Terminal
3F Multi-Use Terminal
22a
30
56
54
24F Cable
Add Terminal (9-12)
90a
Index Only Terminal
22b
22c
90b
(1-4)
22d
22d
Lose Signal during add of new terminal
22f
90c
(5-8)

Splitter Terminal
3F Multi-Use Terminal
22a
24F Cable
Add Terminal (1-4)
70c
Index Only Terminal
22b
22c
70a
(5-8)
22d
22e
Lose Signal during add of new terminal
22f
70b
(9-12)

Splitter Terminal
4F Multi-Use Terminal
22a
30
24F Cable
70a
Add Terminal (9-12)
Index Only Terminal
22b
22c
70b
(1-4)
22d
22e
22f
56
72
74
102
(5-8)
70c
76
54
104
100
Add Patching device to rout to 1st terminal reverse port 28
53
54
30
56
55
58
60
52
50
48
44
46
40
42
1
12
1
12
1
12
1
12
1
12

74
1
12
12
76
80
78
1
70
1
12
72

94
99
95
97
90c
1
12
92

FIBER OPTIC NETWORK ARCHITECTURE WITH PARALLEL INDEXED AND NON-INDEXED FIBER PATHS

CROSS-REFERENCE TO RELATED APPLICATION

This application is a National Stage Application of PCT/US2017/059528, filed on Nov. 1, 2017, which claims the benefit of U.S. Patent Application Ser. No. 62/416,691, filed on Nov. 2, 2016, the disclosures of which are incorporated herein by reference in their entireties. To the extent appropriate, a claim of priority is made to each of the above disclosed applications.

TECHNICAL FIELD

The present disclosure relates generally to fiber optic communications networks. More particularly, the present disclosure relates to network architectures for fiber optic communications networks.

BACKGROUND

Optical networks are becoming increasingly more prevalent in part because service providers want to deliver high bandwidth communication capabilities to customers. There is a need for advanced fiber optic network architectures for more effectively and efficiently extending fiber optic networks to an ever increasing number of customers.

SUMMARY

Aspects of the present disclosure relate to a fiber optic network architecture including a plurality of fiber distribution components daisy chained together to form a chain of fiber distribution components. The chain of fiber distribution components has a first set of optical fiber paths that are indexed along a length of the chain and a second set of optical fiber paths that are not indexed along a length of the chain.

A variety of additional aspects will be set forth in the description that follows. These aspects can relate to individual features and to combinations of features. It is to be understood that both the forgoing general description and the following detailed description are exemplary and explanatory only and are not restrictive of the broad concepts upon which the examples disclosed herein are based.

DETAILED DESCRIPTION

Figure 1:
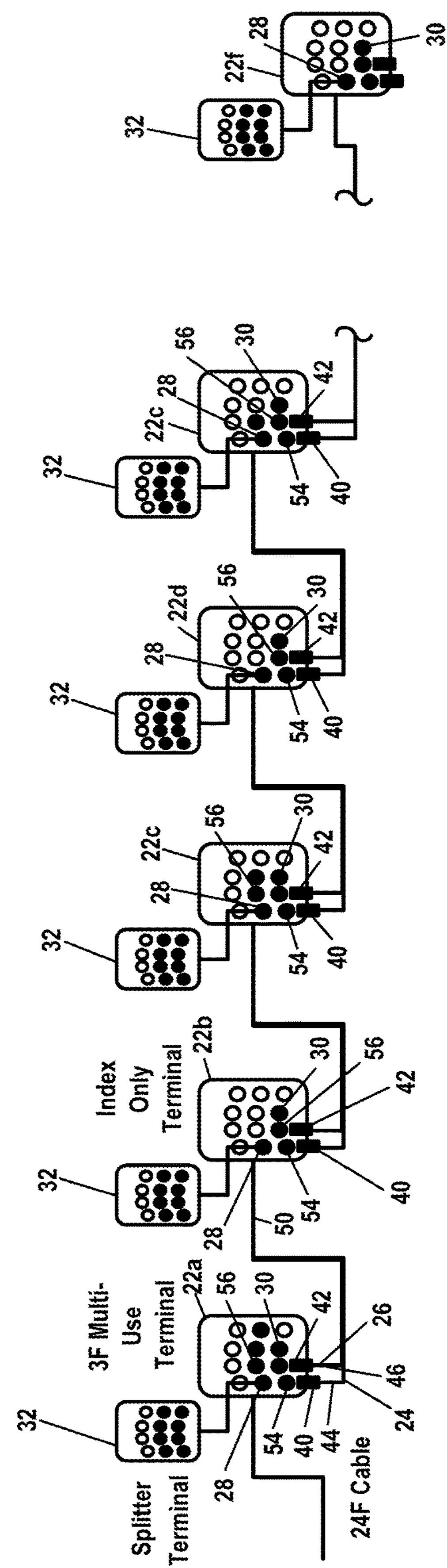
FIG. 1 illustrates a fiber optic network architecture having a plurality of fiber distribution components daisy chained together to form a chain of fiber distribution components, chain of fiber distribution components has a first set of optical fiber paths that are indexed along a length of the chain and a second set of optical fiber paths that are not indexed along a length of the chain.

As used herein, a ruggedized fiber optic connector is a fiber optic connector that more robustly designed than a traditional indoor fiber optic connector such as an SC style fiber optic connector or an LC style fiber optic connector. Ruggedized fiber optic connectors are typically suitable for outdoor use. Ruggedized fiber optic connectors can include single-fiber fiber optic connectors and multi-fiber fiber optic connectors. Ruggedized multi-fiber optic connectors can be referred to as HMFOC connectors (e.g., hardened multi-fiber fiber optic connectors). Certain ruggedized fiber optic connectors in accordance with the principles of the present disclosure are designed to be capable of withstanding pull-out loads greater than 25 lbs. or greater than 50 lbs. when secured to corresponding ruggedized fiber optic connectors or when secured within corresponding ruggedized fiber optic connector ports. Certain ruggedized fiber optic connectors in accordance with the principles of the present disclosure can include rotatable (i.e., twist-to-lock) coupling element (i.e., couplers, fasteners, sleeves, collars, retainers, etc.) for securing the ruggedized connectors within their corresponding connector ports or for securing the ruggedized connectors to corresponding ruggedized connectors. Example rotatable coupling elements include threaded elements (e.g., threaded nuts, threaded sleeves, etc.) and bayonet-style elements.

Certain ruggedized connectors may also include snap-fit coupling elements and sliding lock clips that function as coupling elements. Ruggedized fiber optic connectors in accordance with the principles of the present disclosure can also include seals for sealing with their respective connector ports or for sealing between respective ruggedized male and female fiber optic connectors when such fiber optic connectors are coupled together.

As used herein, demateable fiber optic connection locations often include ferrules supporting optical fibers. The ferrules can include single-fiber ferrules (e.g., cylindrical ferrules such as LC or SC ferrules) for supporting optical fibers corresponding to single-fiber optical connectors. Multi-fiber demateable fiber optic connection locations within the principles of the present disclosure can also include multi-fiber ferrules for supporting a plurality of optical fibers. Example multi-fiber fiber optic ferrules include 12 fiber ferrules such as MPO ferrules which support optical fibers in a sequence such as in a row. It will be appreciated that multi-fiber ferrules can support different numbers of optical fibers such as two fibers, four fibers, eight fibers, twelve fibers, twenty-four fibers, thirty-six fibers, forty-eight fibers or more fibers. In certain examples, the optical fibers can be arranged sequentially one row, two rows or more than two rows. In other examples, ferrule-less demateable fiber optic connection structures can be used. Example ferrule-less demateable fiber optic connection locations are disclosed by PCT Publication No. WO 2016/043922, which is hereby incorporated by reference in its entirety.

Aspects of the present disclosure also relate to using indexing components to extend a fiber optic network outwardly from a field-installed factory manufactured break-out cable. A typical indexing component includes first and second demateable multi-fiber connection locations. Each of the demateable multi-fiber connection locations can include a plurality of optical fiber positions arranged in a sequence. In a preferred example, the optical fibers at the demateable fiber optic connection locations are retained in a particular fiber position sequence by a ferrule. In certain examples, the ferrule can include a two-fiber ferrule, an eight-fiber ferule, a twelve fiber MPO ferrule, a twenty-four fiber ferrule or other ferrules. While ferrules are preferred, ferrule-less systems are also contemplated. Within the indexing component, indexing optical fibers are routed from the first demateable multi-fiber connection location to the second demateable multi-fiber connection location in an indexed configuration. The indexed optical fibers are indexed such that first ends of the optical fibers at the first demateable multi-fiber connection location are at different sequential fiber positions compared to second ends of the optical fibers at the second demateable multi-fiber connection location. Within the indexing component one or more of the sequential fiber positions of the first multi-fiber demateable fiber optic location are not optically connected to any of the sequential fiber positions of the second demateable multi-fiber fiber optic connection location, but instead are optically connected to one or more drop locations by one or more drop optical fibers. The one or more drop locations can each include demateable fiber optic connections for interfacing with additional cables (e.g., drop cables) and components (e.g., terminals such as multi-service terminals, splitter terminals, wavelength division mulit-plexer (WDM) terminals, etc.). Similarly, one or more of the sequential fiber positions of the second demateable multi-fiber connection location are not optically connected to any of the sequential fiber positions of the first demateable multi-fiber connection location, but instead are optically coupled to one or more one or more drop locations by one or more drop optical fibers. The one or more drop locations can each include demateable fiber optic connections for interfacing with additional cables (e.g., drop cables) and components (e.g., terminals such as multi-service terminals, splitter terminals, wavelength division mulit-plexer (WDM) terminals, etc.).

The drop fiber or fibers routed from the first demateable multi-fiber connection location can be referred to as forward drop fiber or forward drop fibers and the drop fiber or fibers routed from the second demateable multi-fiber connection location can be referred to as a reverse drop fiber or reverse drop fibers. It will be appreciated that it is preferred to include forward and reverse drop route fibers, but in certain examples only a forward drop fiber or only a reverse drop fiber may be provided. In certain examples, the forward and/or reverse drop fibers can be routed to single-fiber demateable connection locations. In other examples, where a plurality of forward and/or reverse drop fibers are provided, the drop fibers can be routed to multi-fiber demateable fiber optic connection locations or to a plurality of separate single-fiber demateable fiber optic connection locations. In still other examples, forward and/or reverse drop optical fibers can be routed to optical splitters that split the optical liners into a plurality of optical lines that can be routed to individual demateable fiber optic connection locations or to one or more multi-fiber demateable fiber optic connection locations. The demateable fiber optic connection locations can be ruggedized or non-ruggedized. Additionally, the demateable fiber optic connection locations can be provided as male or female fiber optical connectors terminating the end of tether cables, or as demateable fiber optic connection locations incorporated within ports of a terminal housing adapted for receiving fiber optic connectors. Example configurations for ruggedized single-fiber fiber optic ports/adapters as well as ruggedized single-fiber fiber optic connectors are disclosed by U.S. Pat. No. 7,744,288, which is hereby incorporated by reference in its entirety. Example multi-fiber connection locations with hardened multi-fiber fiber optic connectors are disclosed by International Application No. PCT/US2014/039377, which is hereby incorporated by reference. Example indexing configurations and indexing components are disclosed by U.S. Pat. No. 9,348,096, which is hereby incorporated by reference in its entirety.

Indexing components in accordance with the principles of the present disclosure can include housings defining fiber optic connection ports incorporating demateable single fiber and/or multi-fiber connection locations. In other examples, indexing components in accordance with principles of the present disclosure can include more cable-based constructions having fan-outs configured to fan out optical fibers from a main cable to a plurality of cables or tethers with the cables being terminated at their ends by male or female demateable multi-fiber connection locations.

Figure 8:
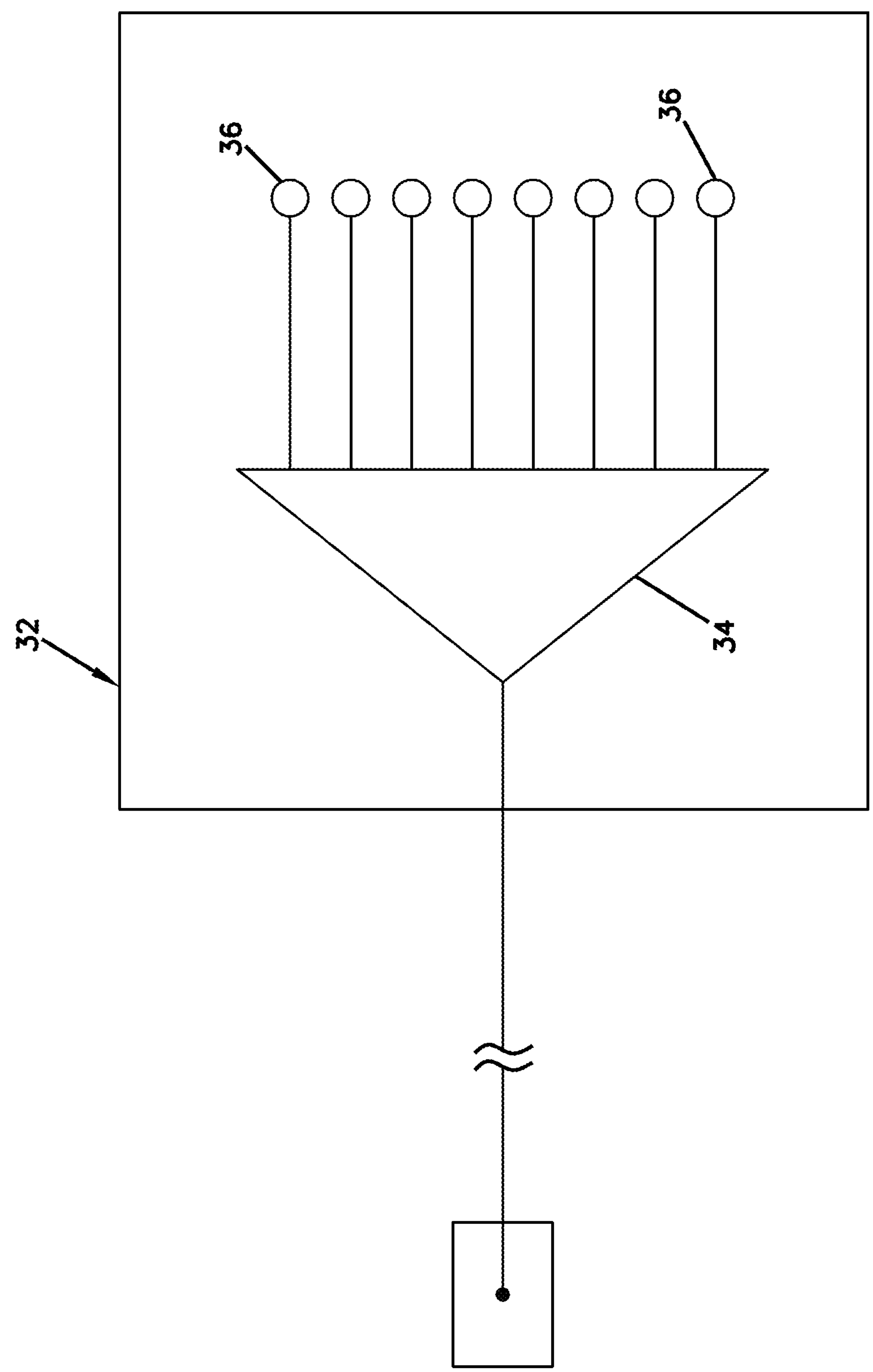
FIG. 8 illustrates an example splitter terminal adapted to be optically coupled to one of the drop ports of the chain of fiber distribution components.

FIG. 1 illustrates a fiber optic network architecture 20 in accordance with the principles of the present disclosure. The fiber optic network architecture 20 includes a plurality of fiber distribution components 22*a*-22*f* daisy chained together to form a chain of fiber distribution components. The chain of fiber distribution components can include a first set of optical fiber paths 24 that are indexed along a length of the chain and a second set of optical fiber paths 26 that are not indexed along a length of the chain. In certain examples, first and second sets of optical fiber paths each include 12 optical fiber paths. In certain examples, the first set of optical fiber paths is indexed in a forward direction and a reverse direction. In certain examples, the first set of optical fiber paths includes forward drop locations 28 dropped from the forward direction and reverse drop locations 30 dropped from the reverse direction. Terminals such as splitter terminals 32 are shown coupled to the forward drop locations 28. The splitter terminals 32 can include a passive optical power splitters 34 that splits optical signals and route such optical signals to ruggedized demateable fiber optic connection locations 36. An example splitter terminal 32 is shown at FIG. 8.

Figure 7:
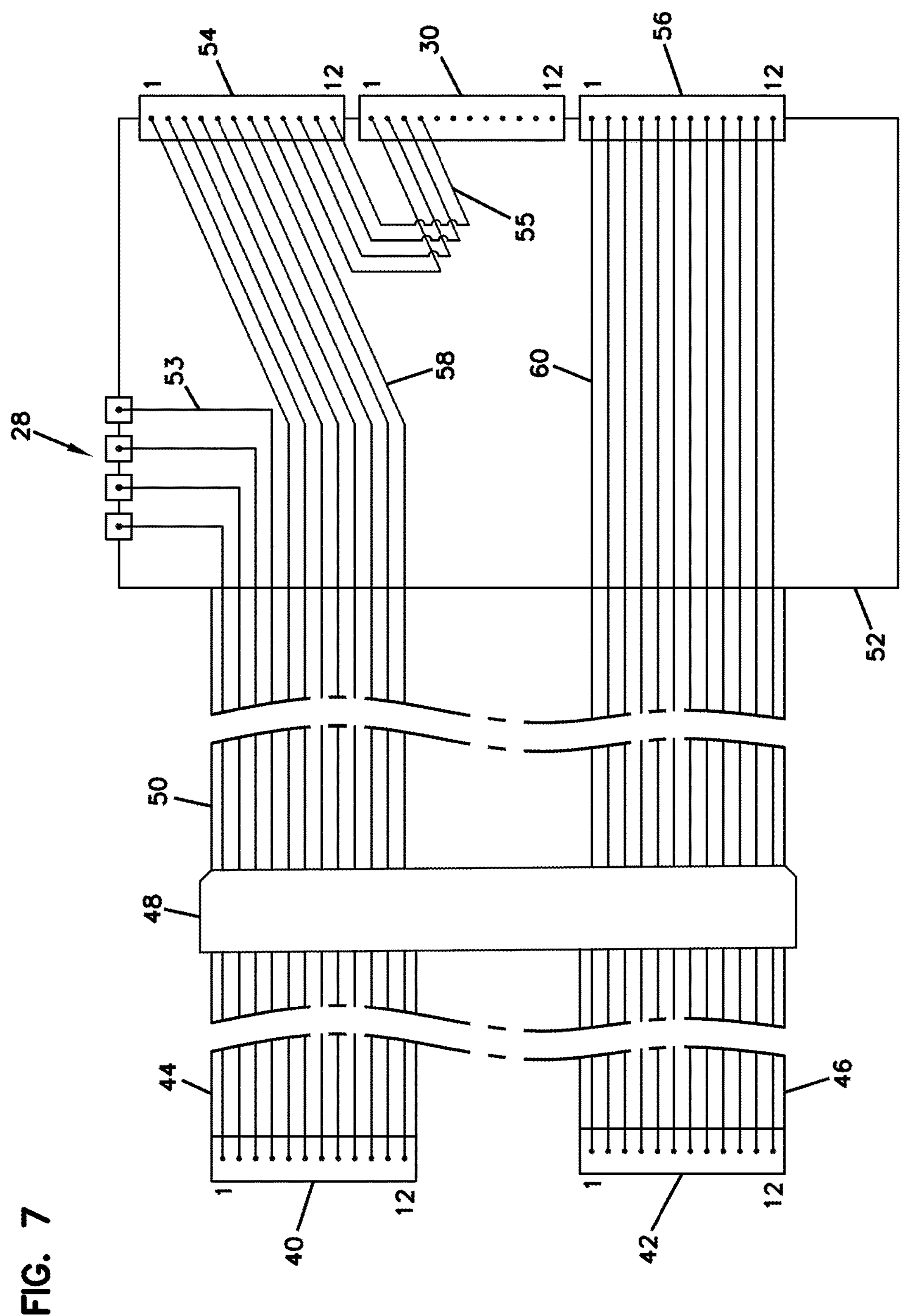
FIG. 7 schematically depicts one of the daisy chained fiber distribution components of the fiber optic network architecture of FIG. 1.

FIG. 7 shows an example fiber distribution component 22*a* that can be used to form the chain of fiber distribution components. It will be appreciated that the fiber distribution components 22*a*-22*f* can have the same basic configuration except for the number of optical fibers dropped in the forward direction to forward drop locations 28. It will be appreciated that the forward and reverse drop locations 28, 30 can each include ruggedized demateable fiber optic connection locations which may be single fiber connection locations or multi-fiber connection locations.

Referring to FIG. 7, the distribution component 22*a* includes a first multi-fiber demateable fiber optic connection location 40 including a first plurality of sequential fiber positions and a second multi-fiber demateable fiber optic connection location 42 including a second plurality of sequential fiber positions. In one example, the first and second multi-fiber demateable fiber optic connection locations can be formed by ruggedized multi-fiber optic connectors mounted at the ends of tethers 44, 46 directed outwardly from a fanout 48. A main cable 50 can be routed from the fanout 48 to a terminal housing 52. The terminal housing 52 can include a third multi-fiber demateable fiber optic connection location 54 including a third plurality of sequential fiber positions and a fourth multi-fiber demateable fiber optic connection location 56 including a fourth plurality of sequential fiber positions. The third and fourth multi-fiber demateable fiber optic connection locations 54, 56 can be provided as ruggedized fiber optic adapters or ports provided on the terminal housing 52. A plurality of indexing fibers 58 are indexed between the sequential fiber positions of the first and third multi-fiber demateable fiber optic connection locations 40, 54. The indexing fibers 58 can be routed from the first multi-fiber demateable fiber optic connection location 40 through the first tether 44 and the main cable 50 to the terminal housing 52. Within the terminal housing 52, the indexing fibers 58 can be routed to the third multi-fiber demateable fiber optic connection location 54 in an indexed configuration which shifts the sequential fiber positions as comparted to at the first connection location 40.

The fiber distribution component 22*a* can also include a plurality of non-indexing fibers 60 routed between the sequential fiber positions of the second multi-fiber demateable fiber optic connection location 42 and the fourth multi-fiber demateable fiber optic connection location 56. The non-indexing fibers 60 are not indexed so that the fibers remain connected to the same sequential positions at both the second and fourth multi-fiber demateable fiber optic connection locations 42, 56. The non-indexing fibers 60 can be routed from the second multi-fiber demateable fiber optic connection location 42 through the second tether 46 and the main cable 50 to the terminal housing 52. Within the terminal housing, the non-indexing fibers 60 are routed to the fourth multi-fiber demateable fiber optic connection location 56.

The fiber distribution component 22*a* also includes at least one forward drop location 28 optically coupled to at least one of the first sequential fiber positions of the first multi-fiber demateable fiber optic connection location 40 by forward drop fibers 53. The forward drop locations 28 of FIG. 7 are shown as four separate single fiber demateable fiber optic connection locations. In other examples, other numbers of forward drop locations can be provided. The forward drop locations can be single fiber drop locations or multi-fiber drop locations. By way of example, the fiber distribution components 22*b*, 22*d* and 22*f* each include only one forward drop location 28, the fiber distribution component 22*c* has three forward drop locations 28 and the fiber drop components 22*e* has two forward drop locations 28.

The fiber distribution component 22*a* also includes a reverse drop location 30 optically coupled to at least one of the sequential fiber positions of the third multi-fiber demateable fiber optic connection location 54 by reverse drop fibers 55. As depicted, the reverse drop location 30 is provided by a multi-fiber demateable fiber optic connection location and four optical fibers 55 are shown dropped in the reverse direction. In other examples, more or fewer than four optical fibers may be dropped. In other examples, the reverse drop locations 30 may include one or more single fiber demateable fiber optic connection locations.

In the daisy chain of FIG. 1, the first demateable multi-fiber connection location 40 of a given one of the fiber distribution components 22 couples to the third demateable multi-fiber fiber optic connection location 54 of the immediately upstream one of the fiber distribution components 22 in the chain, and the second demateable multi-fiber fiber optic connection location 42 of the given fiber distribution component 22 couples to the fourth demateable multi-fiber fiber optic connection location 56 of the immediately upstream fiber distribution component 22 in the chain. In this way, the fiber distribution components 22*a*-22*f* are daisy chained together with the indexed fiber optic pathways passing through the first and third demateable multi-fiber fiber optic connection locations 40, 54 and the non-indexed fiber optic pathways passing through the second and fourth demateable multi-fiber fiber optic connection locations 42, 56.

Figure 2:
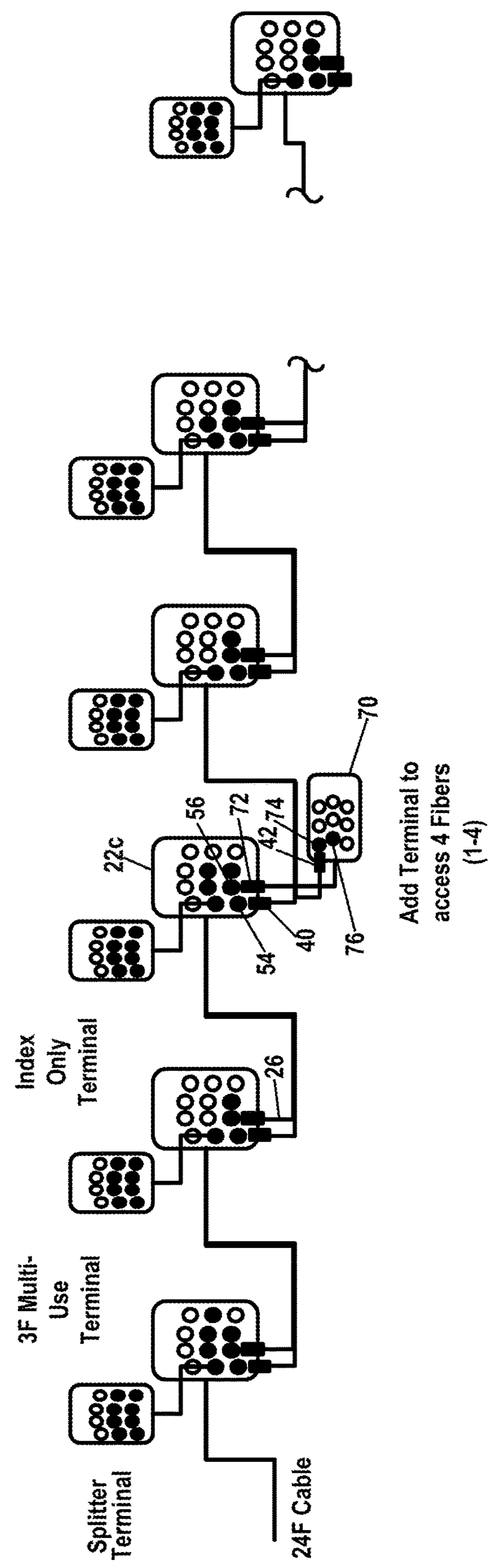
FIG. 2 shows the fiber optic architecture of FIG. 1 with an indexing terminal coupled to the non-indexed set of optical fiber paths.
Figure 9:
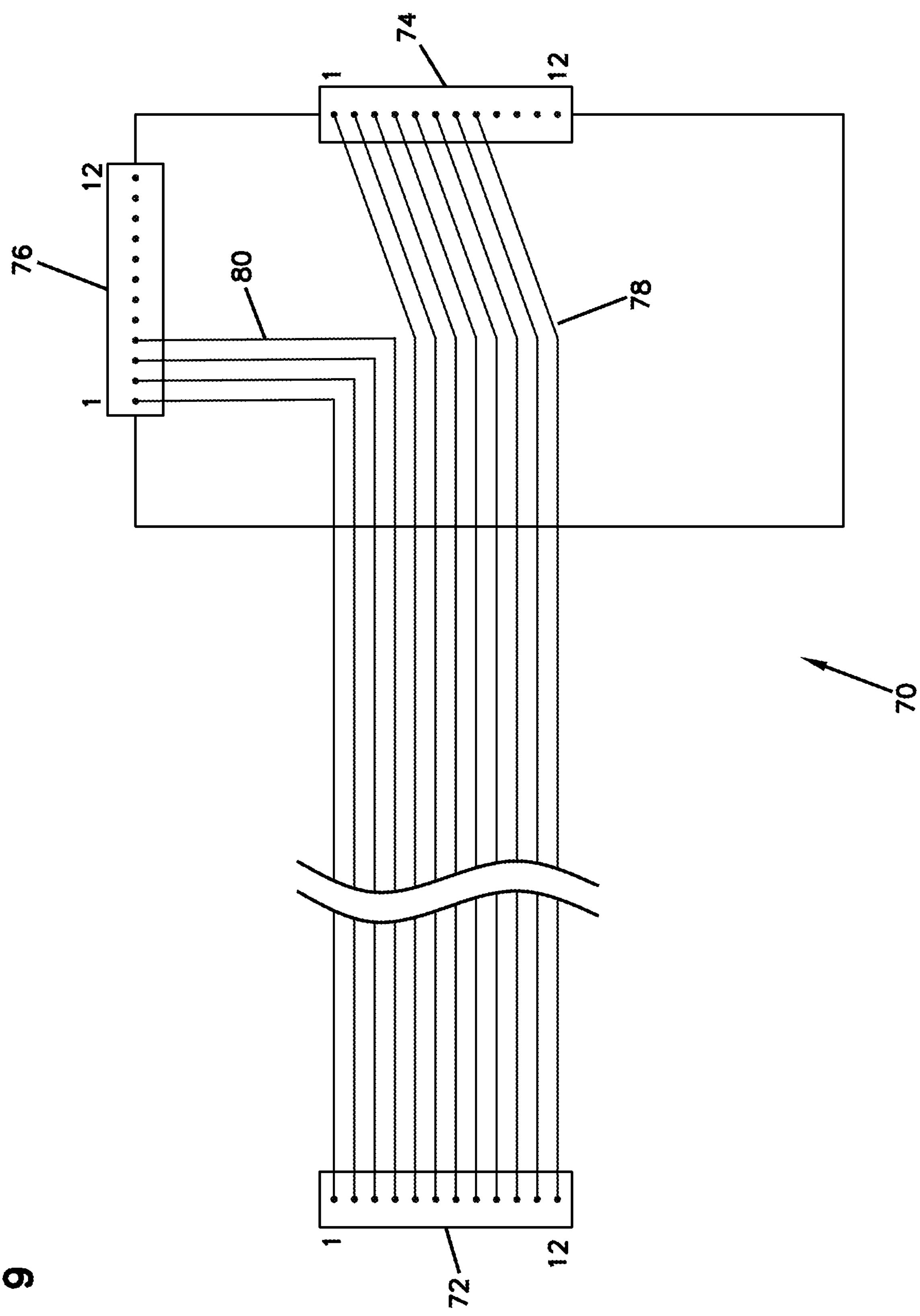
FIG. 9 illustrates an example configuration for an indexing terminal adapted to be coupled to a plurality of the non-indexed optical fiber paths of the chain of FIG. 1.
Figure 10:
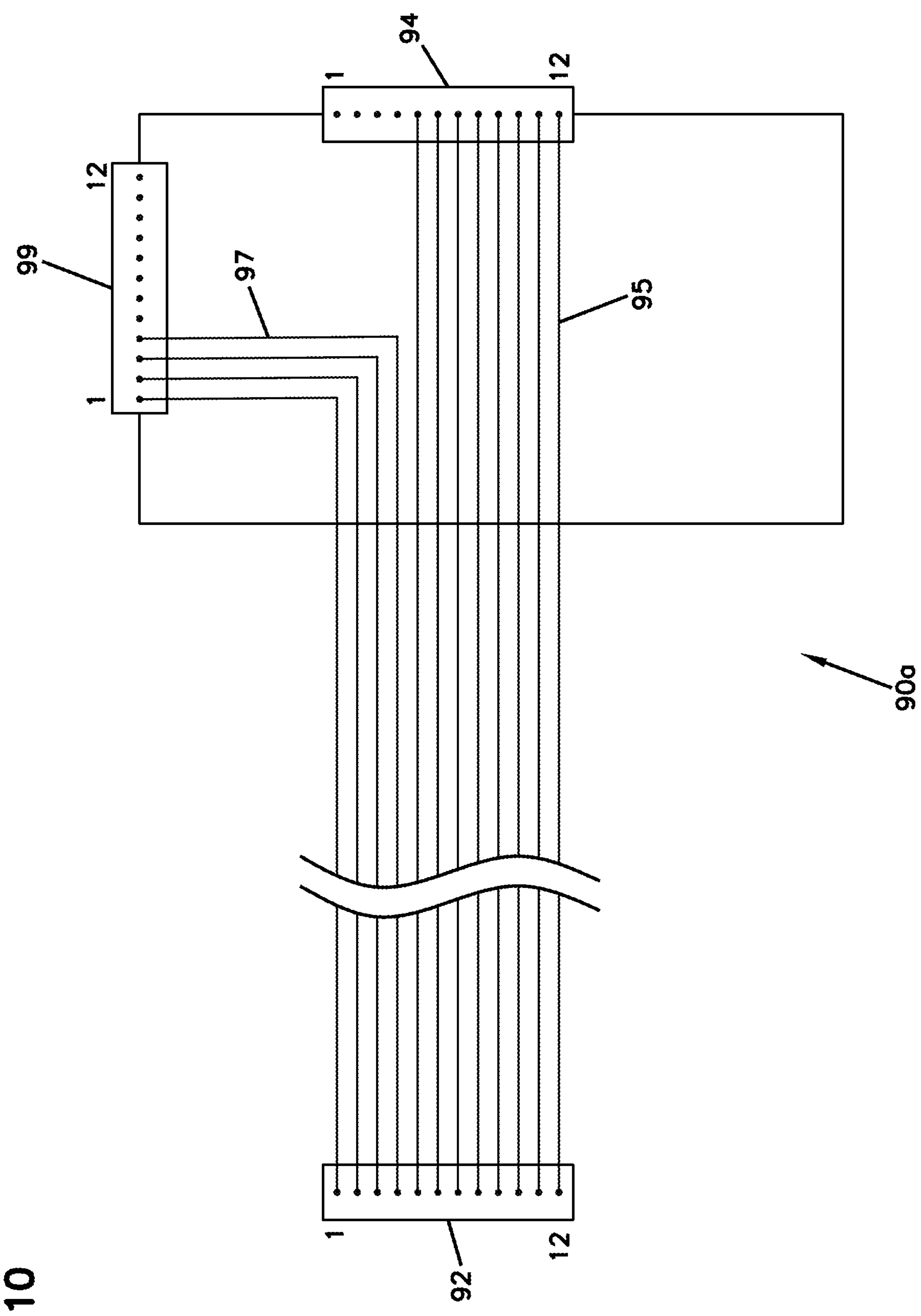
FIG. 10 illustrates a custom terminal adapted to be optically coupled to selected optical fiber paths of the non-indexed optical fiber paths of the daisy chain of the fiber optic network of FIG. 1.
Figure 11:
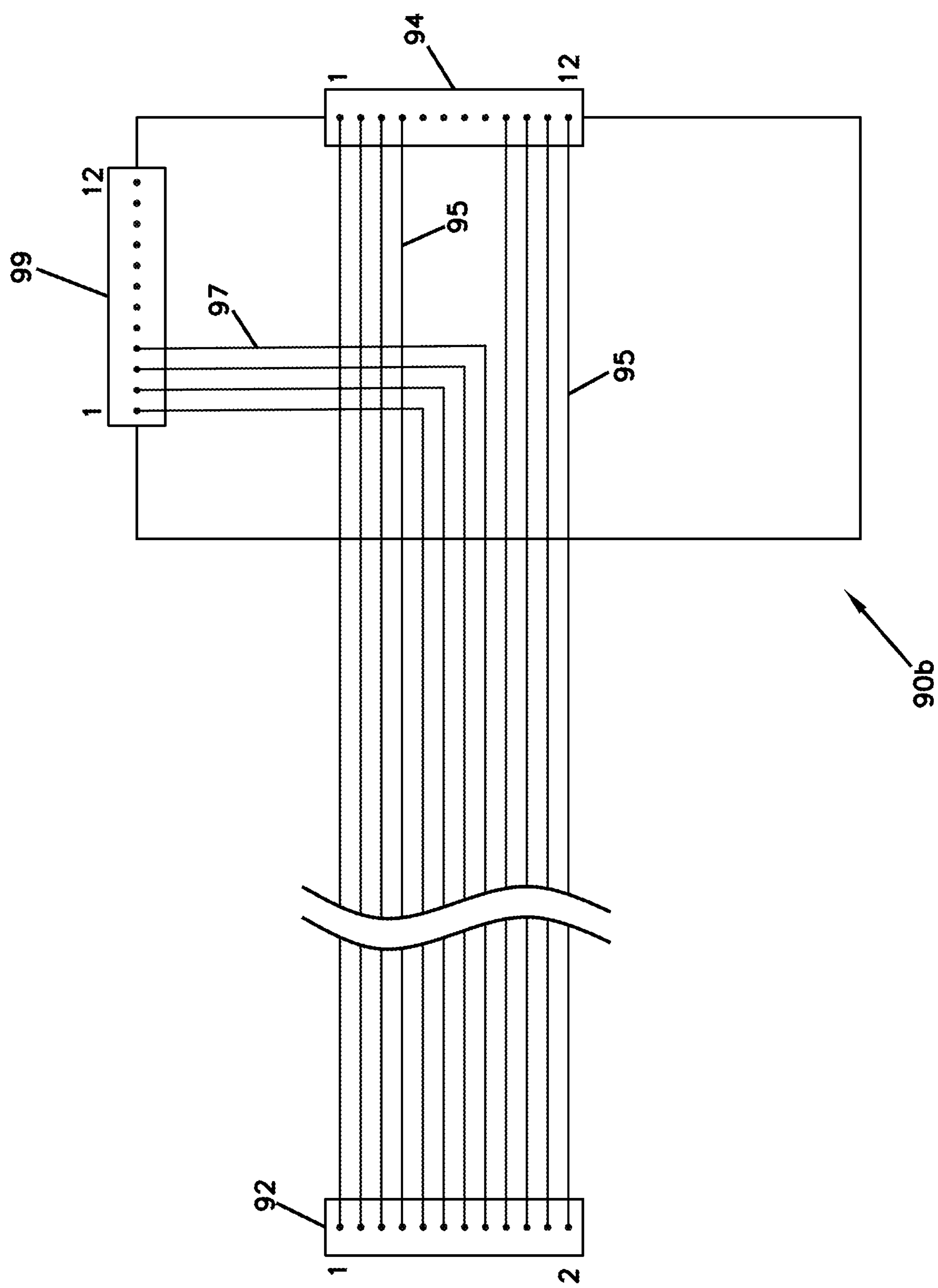
FIG. 11 illustrates another custom terminal adapted to be coupled to selected optical fiber paths of the non-indexed fiber paths of the daisy chain of the fiber optic network of FIG. 1.
Figure 12:
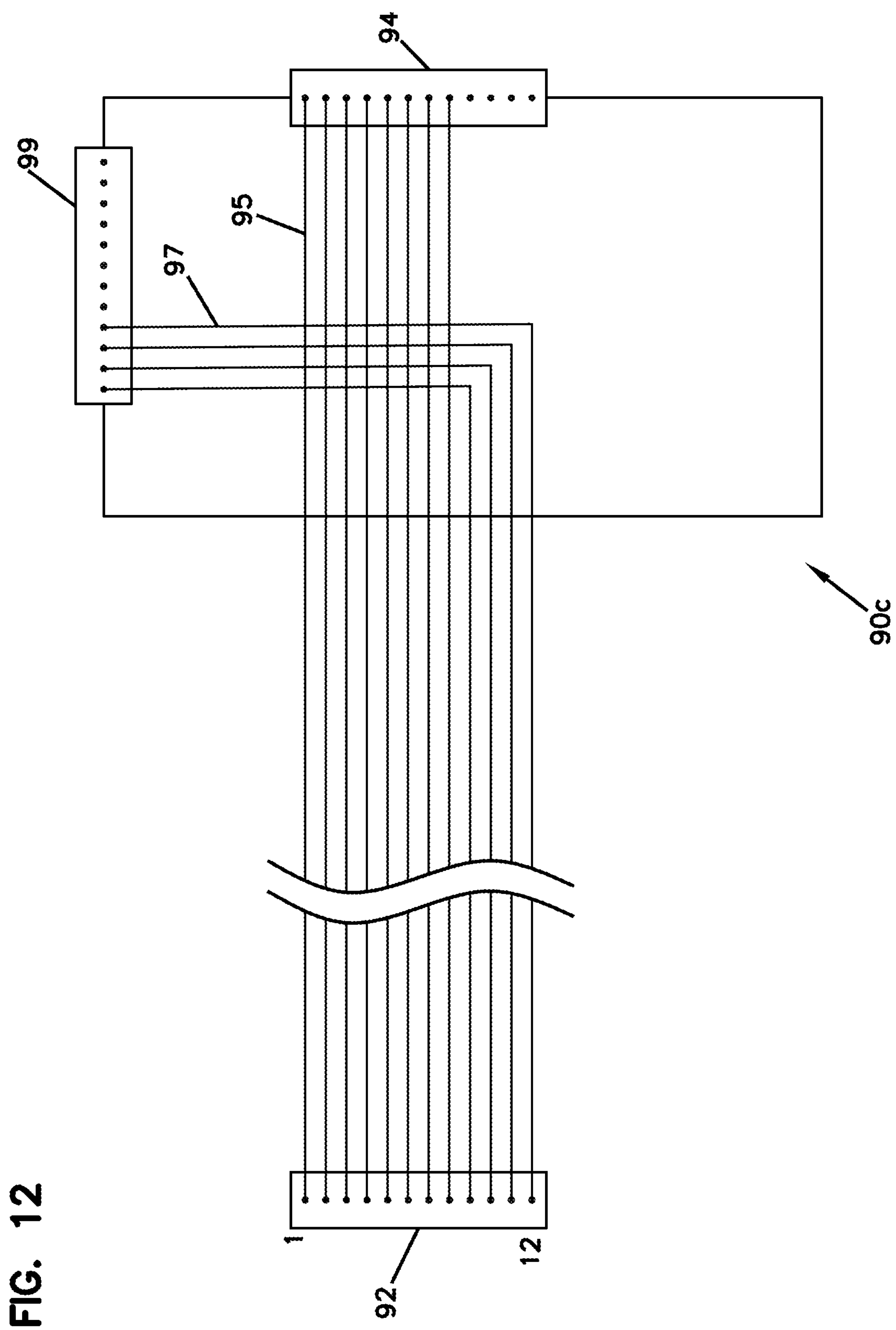
FIG. 12 illustrates still another custom terminal adapted to be optically coupled to selected optical fiber paths of the non-indexed fiber paths of the daisy chain of the fiber optic network of FIG. 1.

FIG. 2 shows an indexing terminal 70 coupled to the second set of non-indexed optical fiber paths 26. The indexing terminal 70 is shown coupled to the fiber distribution component 22*c*. As shown at FIG. 9, the indexing terminal 70 includes a first demateable multi-fiber fiber optic connection location 72, a second demateable multi-fiber fiber optic connection location 74, and a third demateable multi-fiber fiber optic connection location 76. Indexing fibers 78 couple positions 5-12 of the first demateable multi-fiber fiber optic connection location 72 to positions 1-8 of the second demateable multi-fiber fiber optic connection location 74. Drop fibers 80 optically couple positions 1-4 of the first demateable multi-fiber fiber optic connection location 72 to the third demateable multi-fiber fiber optic connection location 76.

When the indexing terminal 70 is integrated with the fiber optic network architecture 20, the first demateable multi-fiber fiber optic connection location 72 couples to the fourth demateable multi-fiber fiber optic connection location 56 of one of the distribution components 22, and the second demateable multi-fiber fiber optic connection location 42 of an immediately downstream one of the fiber distributions components 22 couples to the second demateable multi-fiber fiber optic connection location 74 of the indexing terminal 70.

Figure 3:
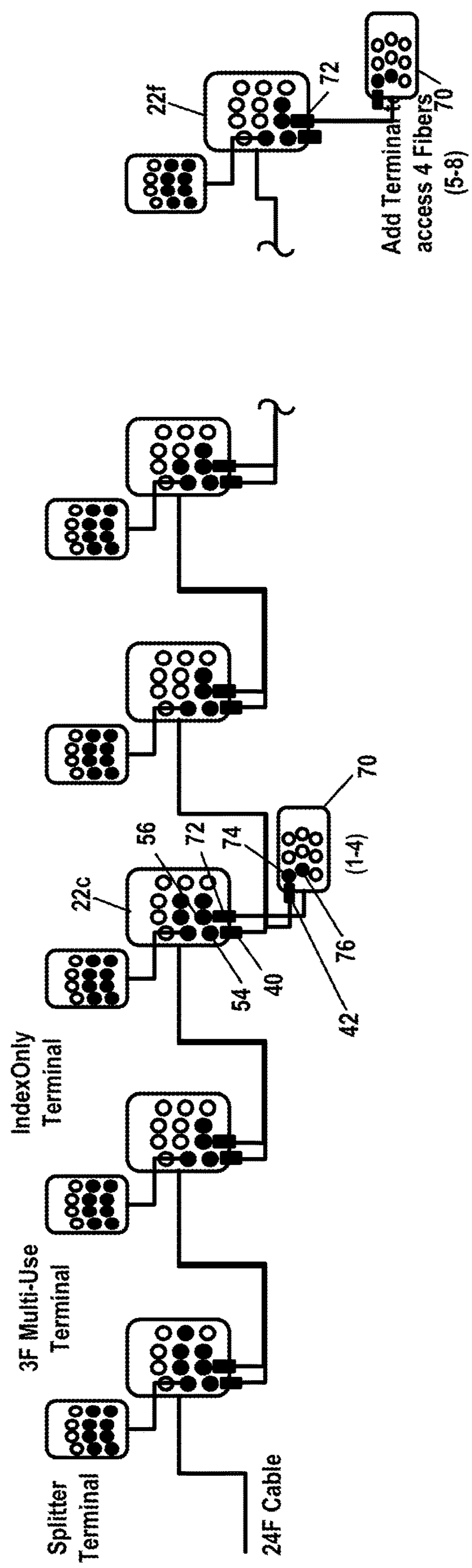
FIG. 3 shows the fiber optic network architecture of FIG. 1 with two indexing terminals coupled to the non-indexed set of optical fiber paths.

FIG. 3 shows an example where two of the indexing terminals 70 have been integrated with the fiber optic network architecture 20 to provide further fiber optic connection locations.

Figure 4:
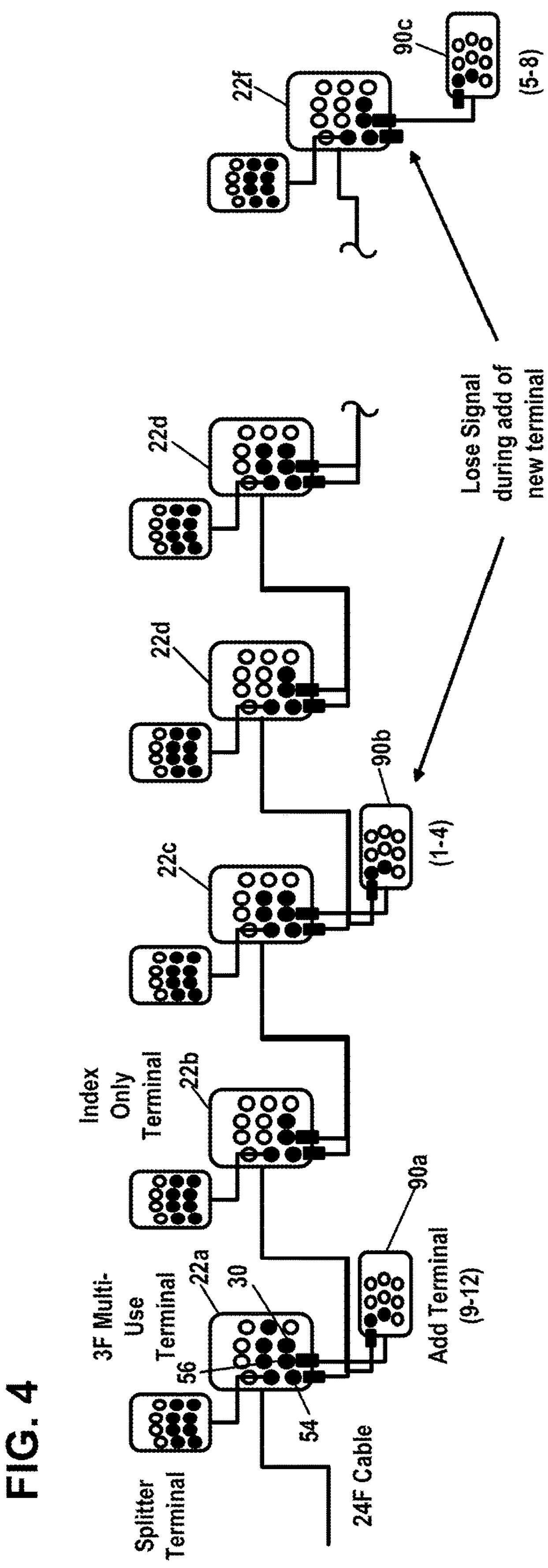
FIG. 4 illustrates the fiber optic network architecture of FIG. 1 with three custom, non-indexing terminals coupled to the non-indexing set of optical fiber paths.

FIG. 4 shows an example where unique or customized terminals 90*a*-90*c* are integrated with the fiber optic network architecture 20. The terminals 90*a*-90*c* do not include indexing functionality. Each of the terminals is adapted to access or select a certain set of the non-indexed set of optical fibers that run through the chain of fiber distribution components. Terminal 90*a* provides access to fibers 1-4, terminal 90*b* provides access to fibers 5-8, and terminal 90*c* provides access to fibers 9-12. The un-accessed fibers are passed on through the daisy chain without being indexed. For example, in terminal 90*a*, fibers 5-12 are passed on. In terminal 90*b*, fibers 1-4 and 9-12 are passed on. For terminal 90*c*, fibers 1-8 are passed on. In the terminals 90*a*-90*c*, a first demateable multi-fiber fiber optic connection location 92 can couple to the fourth demateable multi-fiber fiber optic connection location 56 of a corresponding one of the fiber distribution components 22, and a second demateable multi-fiber fiber optic connection location 94 can be optically coupled to the second demateable multi-fiber fiber optic connection location 42 of a fiber distribution component 22 located immediately downstream in the chain. Fibers 95 are non-indexing fibers and extend between the connection locations 92, 94 without altering the fiber sequencing. Thus, fibers 95 are positioned at the same sequential positions at each of the connection locations 92, 94. Drop fibers 97 are routed from certain sequential fiber positions of the first connection location 92 to a demateable drop connection location 99.

Figure 5:
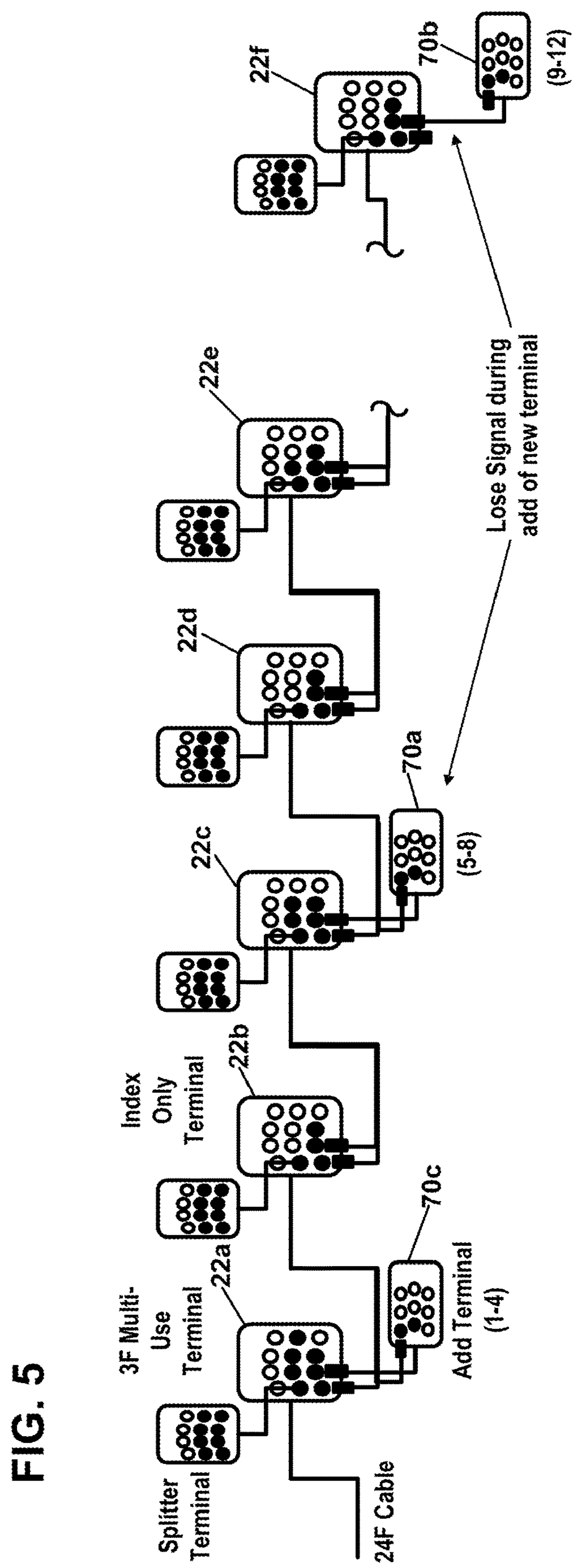
FIG. 5 illustrates the fiber optic network architecture of FIG. 1 with three indexing terminals coupled to the non-indexing set of optical fiber paths.

FIG. 5 is an example of the fiber optic network architecture 20 of FIG. 1 with three of the indexing terminals 70 integrated with the network architecture. In the example of FIG. 5, if terminal 70*a* is added after terminals 70*b*, 70*c*, a signal loss will occur at terminals 70*b*, 70*c* at the time terminal 70*a* is installed.

Figure 6:
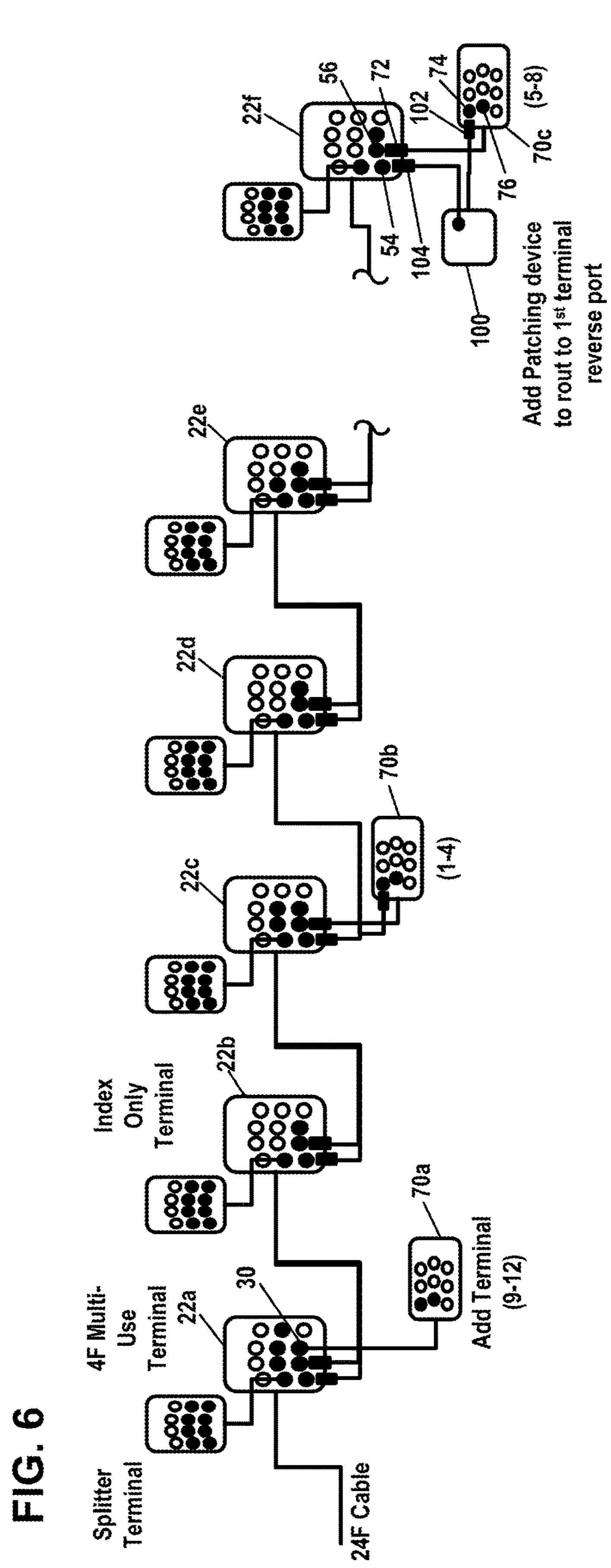
FIG. 6 illustrates the fiber optic network architecture of FIG. 1 with two indexing terminals coupled directly to the non-indexing optical fiber paths and a third terminal optically connected to certain ones of the non-indexed optical fiber paths via reverse indexing paths of the chain.
Figure 13:
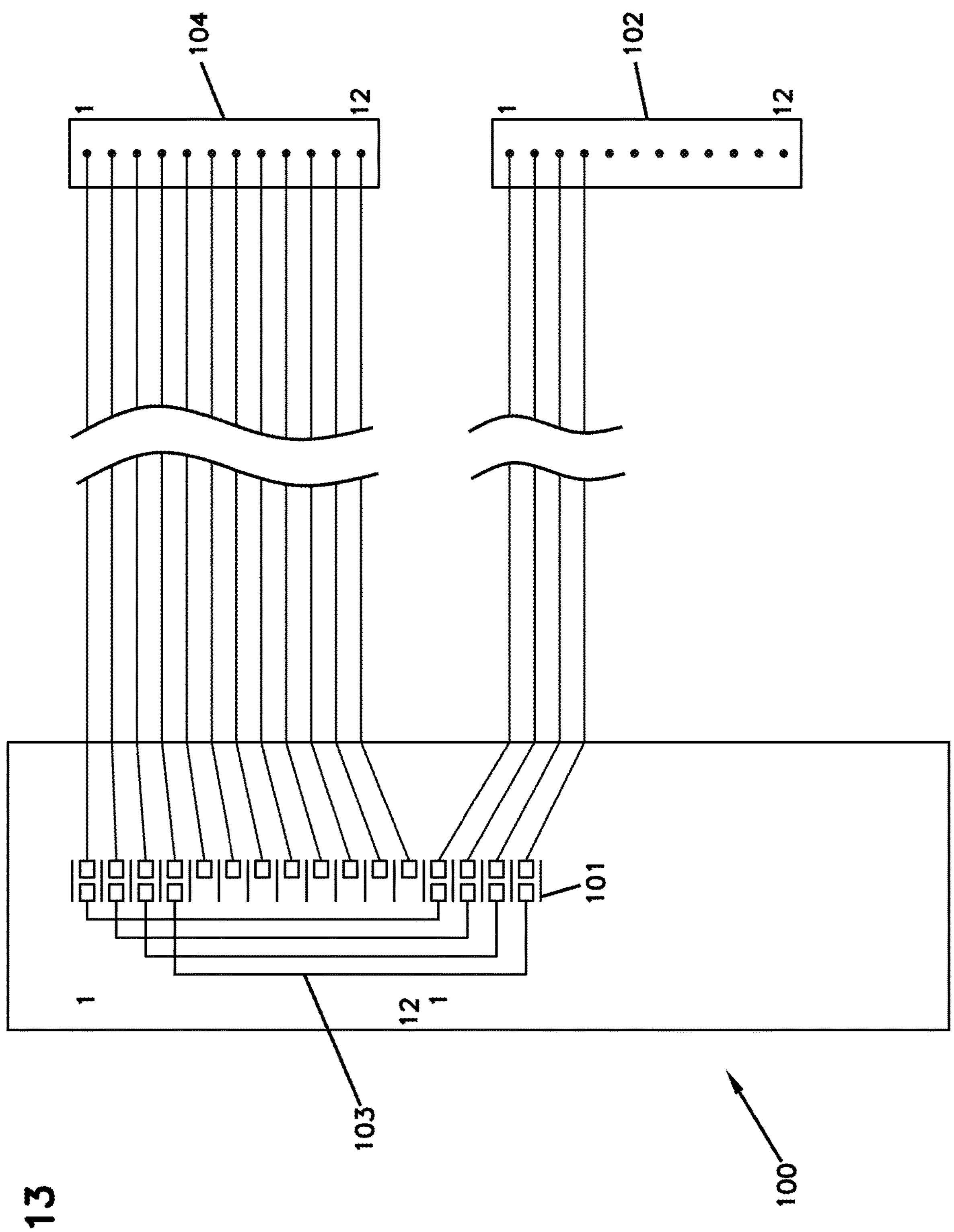
FIG. 13 illustrates an example loop-back apparatus for use with the network architecture of FIG. 1, the loop-back apparatus has patching capabilities.
Figure 14:
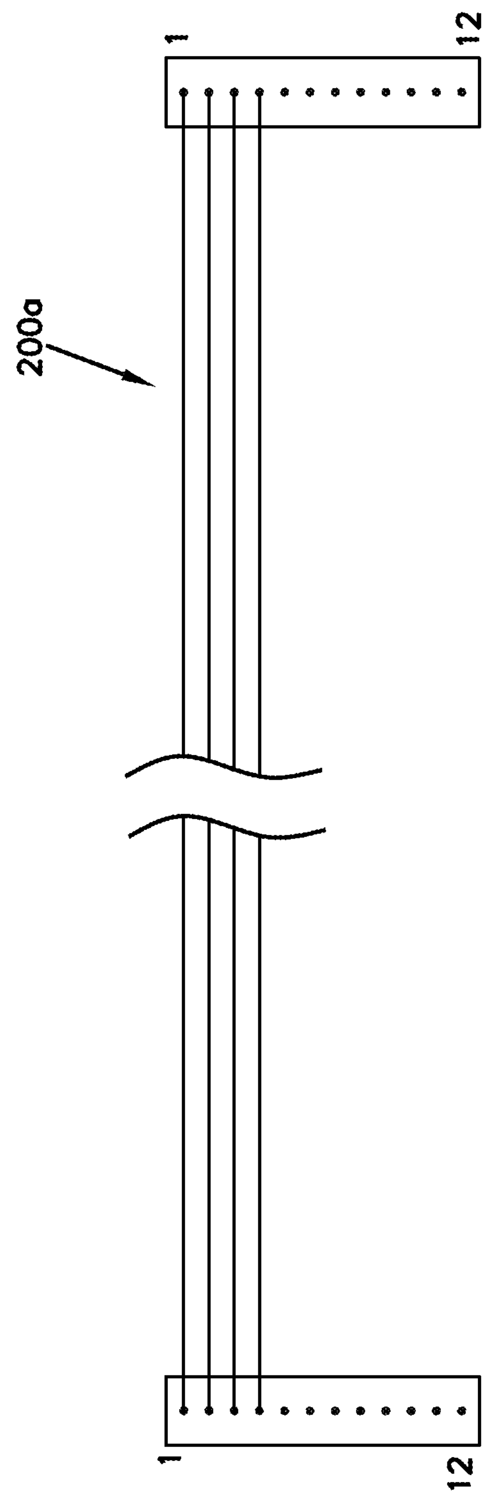
FIG. 14 shows another loop-back apparatus adapted for use with the network architecture of FIG. 1.
Figure 15:
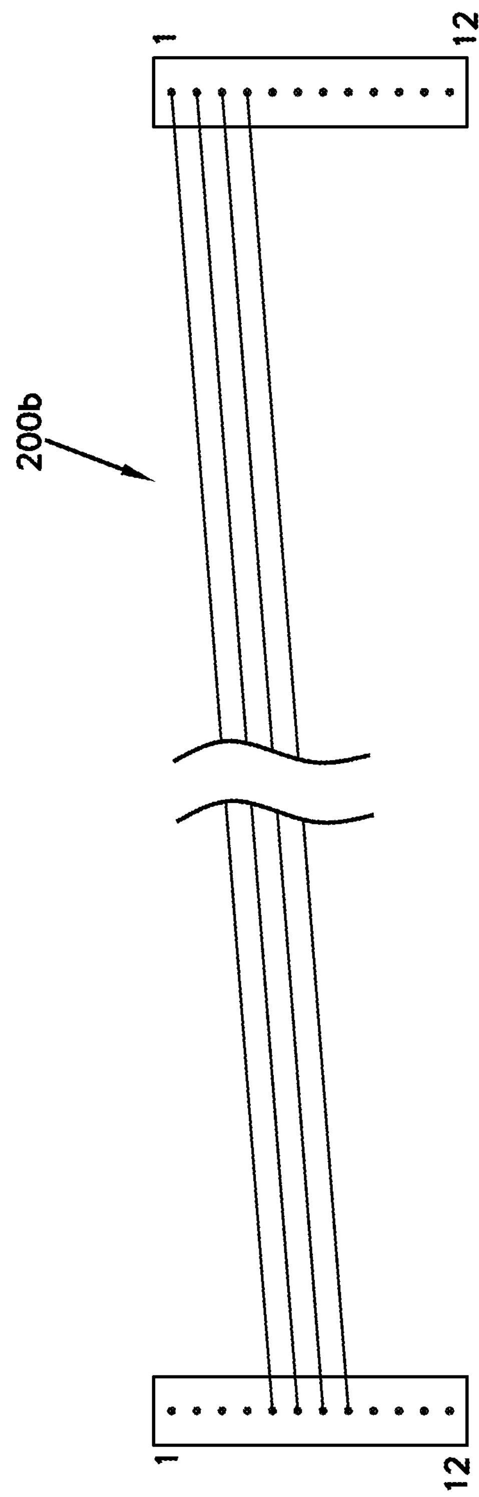
FIG. 15 illustrates still another loop-back apparatus adapted for use with the network architecture of FIG. 1.
Figure 16:
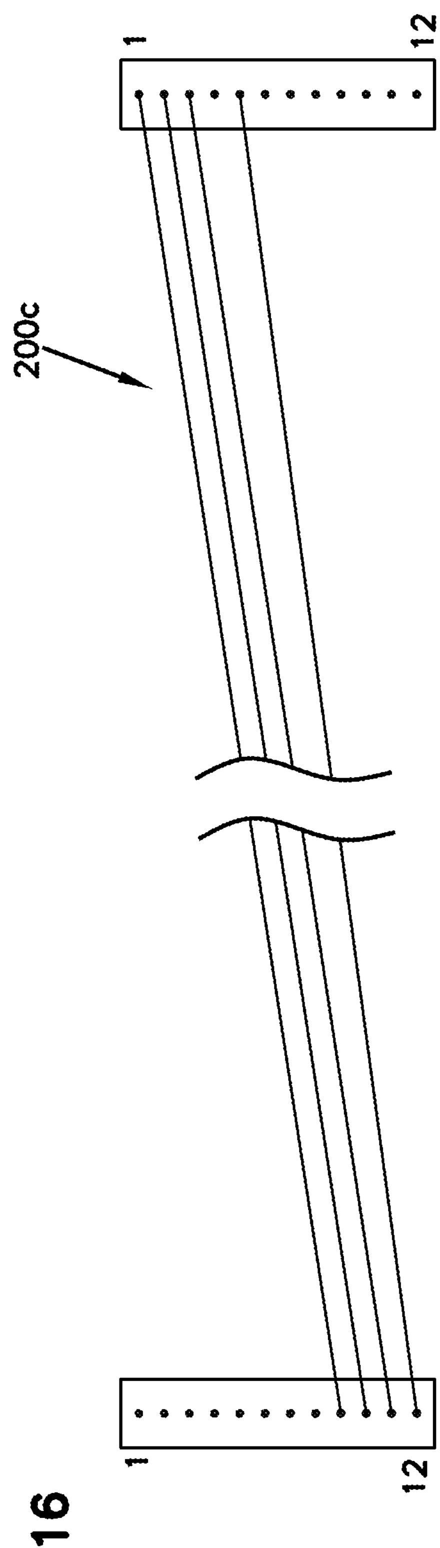
FIG. 16 illustrates a further loop-back apparatus adapted for use with the network architecture of FIG. 1.
Figure 17:
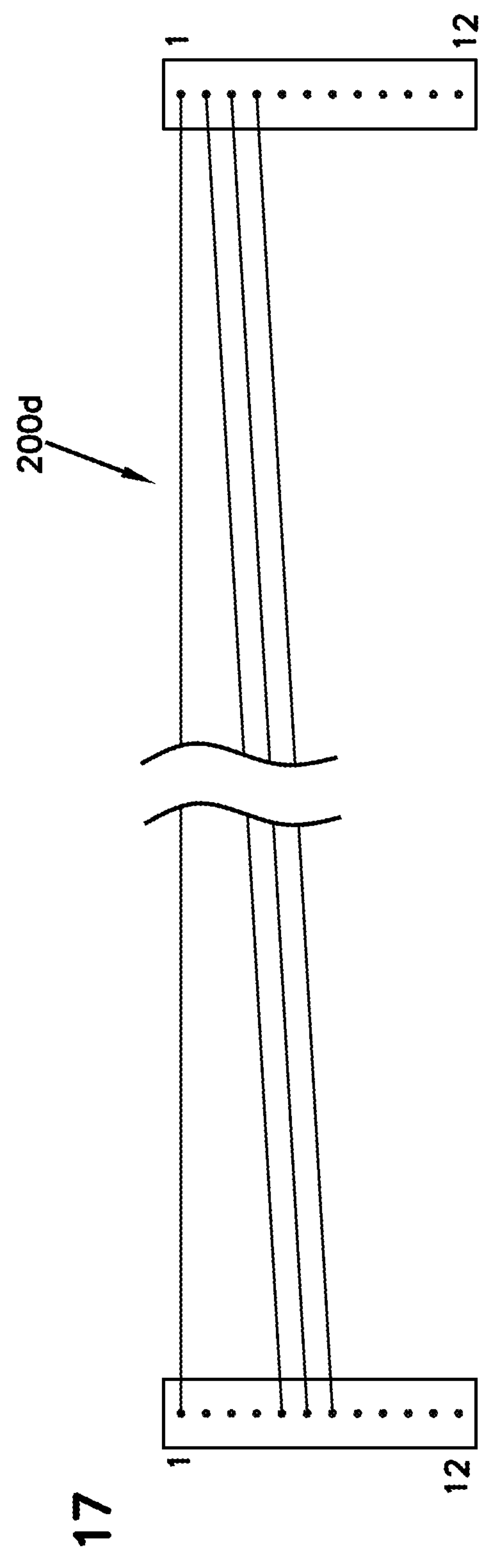
FIG. 17 illustrates still another loop-back apparatus adapted for use with the network architecture of FIG. 1.

FIG. 6 shows an example where a loop-back device 100 is used to loop-back signals from the non-indexed optical fiber paths (e.g., corresponding to connection location 42, 56 to the reverse indexed fibers (corresponding to drop locations 30) so that a signal can be provided to the indexing terminal 70*a* without interrupting service to terminals 70*b* and 70*c*. In the example of FIG. 6, the terminal 70*a* is coupled to the reverse drop location 30 of the fiber distribution component 22*a*. The loop-back device 100 can have patching capability as shown at FIG. 13. For example, the device 100 can include fiber optic adapters 101 (for mechanically and optically coupling two fiber optic connectors) that may be arranged in a patch panel or other arrangement so that unused optical fibers corresponding to the non-indexed optical fibers of the chain of fiber distribution components can be optically connected to specific reverse drop locations 30 in the chain. Connectorized patch cables 103 can be used to provide optical coupling to selected reverse optical paths.

The loop-back device 100 can include a first demateable multi-fiber fiber optic connection location 100 that optically connects to the second demateable multi-fiber fiber optic connection location 74 of the indexing terminal 70*c* and a second demateable multi-fiber fiber optic connection location 104 that optically connects to the third demateable multi-fiber fiber optic connection location 54 of the fiber distribution component 22*f*. The first connection location 72 of the indexing terminal 70*c* couples to the connection location 56 of the distribution terminal 22*f*. By optically coupling signal paths from the connection location 56 of the component 22*f* to positions 1-4 of the connection location 104 (and thus positions 1-4 of the connection location 54) via a loopback device, the accessed signal paths are connected to the four reverse drop fibers 55 of the component 22*a*. By optically coupling signal paths from the connection location 56 of the component 22*f* to positions 5-8 of the connection location 104 (and thus positions 5-8 of the connection location 54), the accessed signal paths are connected to the reverse drop locations 30 of the components 22*b* and 22*c*. By optically coupling signal paths from the connection location 56 of the component 22*f* to positions 9-12 of the connection location 104 (and thus positions 9-12 of the connection location 540, the accessed signal paths are connected to the reverse drop locations 30 of the components 22*d*, 22*e* and 22*f* Thus, the patch cords and patching arrangement allows the reverse drop output location to be specifically selected.

FIGS. 14-17 show other loop-back configurations that allow different fiber positions to be looped back to the reversed indexed fibers. The loop back configurations include patch cables 200*a*-200*d* having different fiber position switching arrangements. The cables 200*a*-200*d* can be coupled between the connection location 74 of the terminal 70*c* and the connection location 54 of the component 22*f*. The cables each provide a different sequential fiber position shift between opposite connectorized ends of the patch cables. By selecting the cable with the suitable fiber shift arrangement and by connecting the selected cable between the connection locations 74, 54, desired reverse drop locations can be activated (e.g., provide with live signals) based on the fiber shift arrangement selected. Cables having fiber shifts other than those depicted can also be used.

Various modifications and alterations of this disclosure will become apparent to those skilled in the art without departing from the scope and spirit of this disclosure, and it should be understood that the scope of this disclosure is not to be unduly limited to the illustrative examples set forth herein.

What is claimed is:

1. A fiber optic network comprising:

a plurality of fiber distribution components daisy chained together to form a chain of fiber distribution components, the chain of fiber distribution components having first and second sets of optical fiber paths extending along a length of the chain from a first of the fiber distribution components of the chain, through at least a second of the fiber distribution components of the chain, to a third of the fiber distribution components of the chain, the first set of optical fiber paths being indexed along the length of the chain and the second set of optical fiber paths being not indexed along the length of the chain.

2. The fiber optic network of claim 1, wherein the first and second sets of fiber paths each include 12 fiber paths.

3. The fiber optic network of claim 1, wherein the first set of fiber paths is indexed in a forward direction and a reverse direction, wherein the first set of fiber paths includes forward drop locations dropped from the forward direction and reverse drop locations dropped from the reverse direction, and wherein a loop-back device is used to optically connect optical fiber paths from the second set of optical fiber paths to the reverse drop locations.

4. The fiber optic network of claim 3, wherein the loop-back device includes patching capabilities for coupling the optical fiber paths from the second set of optical fiber paths to selected ones of the reverse drop locations.

5. The fiber optic network of claim 3, further comprising a plurality of terminals each coupled to the forward drop location of one of the fiber distribution components.

6. The fiber optic network of claim 5, wherein each terminal houses a passive optical splitter that splits optical signals received from the respective forward drop location and routes such split optical signals to ruggedized demateable fiber optic connection locations.

7. The fiber optic network of claim 3, wherein the forward and reverse drop locations each include ruggedized demateable fiber optic connection locations.

8. The fiber optic network of claim 3, wherein at least one of the forward drop locations is a single fiber connection location.

9. The fiber optic network of claim 3, wherein at least one of the forward drop locations is a multi-fiber connection location.

10. The fiber optic network of claim 1, wherein each fiber distribution component includes a plurality of indexing fibers indexed between multi-fiber demateable fiber optic connection locations.

11. The fiber optic network of claim 1, wherein each fiber distribution component also includes plurality of non-indexing fibers routed between other multi-fiber demateable fiber optic connection locations.

12. A fiber distribution component comprising:

a first multi-fiber demateable fiber optic connection location including a first plurality of sequential fiber positions;

a second multi-fiber demateable fiber optic connection location including a second plurality of sequential fiber positions;

a third multi-fiber demateable fiber optic connection location including a third plurality of sequential fiber positions;

a fourth multi-fiber demateable fiber optic connection location including a fourth plurality of sequential fiber positions;

a plurality of indexing fibers indexed between the first and third pluralities of sequential fiber positions; and a plurality of non-indexing fibers routed between the second and fourth pluralities of sequential fiber positions; and at least one of the sequential fiber positions of the first plurality of sequential fiber positions being optically coupled to a drop location of the indexing component, the drop location including a demateable fiber optic connection interface.

13. The distribution device of claim 12, further comprising at least one of the third sequential fiber positions being routed to a demateable reverse drop location.

14. The distribution device of claim 13, wherein the demateable reverse drop location is provided by a multi-fiber demateable fiber optic connection location.

15. The distribution device of claim 13, wherein the demateable reverse drop location is provided by one or more single-fiber demateable fiber optic connection locations.

16. The distribution device of claim 12, wherein the first and second demateable fiber optic connection locations are respectively provided at the end of first and second tethers routed from a cable fan-out, wherein the third and fourth demateable fiber optic connection locations are provided on a terminal, wherein the drop location is provided at the terminal, and wherein a main cable is routed from the cable fan-out to the terminal.

17. The distribution device of claim 16, wherein the first and second multi-fiber demateable fiber optic connection locations are formed by ruggedized multi-fiber optic connectors mounted at the ends of the first and second tethers.

18. The distribution device of claim 16, wherein the third and fourth multi-fiber demateable fiber optic connection locations include ruggedized fiber optic adapter ports provided on a housing of the terminal.

19. The distribution device of claim 12, wherein the drop location is one of a plurality of forward drop locations, each forward drop location being optically coupled to a respective one of the sequential fiber positions of the first plurality of sequential fiber positions.

20. The distribution device of claim 19, wherein each forward drop location including a respective demateable fiber optic connection interface.

21. A fiber optic network comprising:

a plurality of fiber distribution components daisy chained together to form a chain of fiber distribution components, the chain of fiber distribution components having a first set of optical fiber paths that are indexed along a length of the chain and a second set of optical fiber paths that are not indexed along a length of the chain, wherein the first set of fiber paths is indexed in a forward direction and a reverse direction, wherein the first set of fiber paths includes forward drop locations dropped from the forward direction and reverse drop locations dropped from the reverse direction, and wherein a loop-back device is used to optically connect optical fiber paths from the second set of optical fiber path to the reverse drop locations.

* * * * *